United States Patent [19]

Kobayashi et al.

[11] Patent Number: 4,546,691
[45] Date of Patent: Oct. 15, 1985

[54] VACUUM POWER SERVO BOOSTER

[75] Inventors: Michio Kobayashi; Yasuo Tsuyuki, both of Saitama, Japan

[73] Assignee: Jidosha Kiki Company, Limited, Japan

[21] Appl. No.: 320,030

[22] Filed: Nov. 10, 1981

[30] Foreign Application Priority Data

Nov. 12, 1980 [JP] Japan .......................... 55-161725[U]

[51] Int. Cl.$^4$ .............................................. F15B 9/10
[52] U.S. Cl. ............................... 91/376 R; 91/369 A; 137/627.5; 267/179
[58] Field of Search ............ 91/369 R, 369 A, 369 B, 91/376 R, 374; 60/547.1, 554; 137/627.5; 92/94, 130 R; 267/170, 179

[56] References Cited

U.S. PATENT DOCUMENTS

| | | | |
|---|---|---|---|
| 3,661,054 | 5/1972 | Brown | 91/376 X |
| 3,754,450 | 8/1973 | Putt | 91/376 R |
| 3,780,620 | 12/1973 | Gardner | 91/376 R |
| 3,826,175 | 7/1974 | Thiel et al. | 91/369 B |
| 4,117,769 | 10/1978 | Carré et al. | 91/369 A X |
| 4,227,371 | 10/1980 | Takeuchi | 91/369 B |
| 4,256,016 | 3/1981 | Thomas | 91/376 R X |
| 4,279,193 | 7/1981 | Satoh | 91/376 R |
| 4,399,736 | 8/1983 | Schubert | 137/627.5 |

*Primary Examiner*—Abraham Hershkovitz
*Attorney, Agent, or Firm*—Sughrue, Mion, Zinn, Macpeak, and Seas

[57] ABSTRACT

A vacuum power servo booster having an improved retainer for an annular seat of a control valve body. A spring seat for a compression spring which presses the annular seat against the valve housing is formed at the front end portion of a retainer. A recess is formed on the front side of the spring seat to receive the skirt of the control valve body. The spring seat is formed by bending a smaller diameter portion of the retainer inwardly prior to assembly. In this manner, the longitudinal axis of the retainer is made to substantially coincide with that of the control valve body.

2 Claims, 2 Drawing Figures

VACUUM POWER SERVO BOOSTER

BACKGROUND OF THE INVENTION

The present invention relates to a vacuum power servo booster which is used as a power servo booster for a brake or a clutch. More particularly, the invention relates to such a servo booster having an improved interior structure of a valve housing which extends from the axial part of a piston in the vacuum power servo booster.

FIG. 1 shows a conventional brake power servo booster. In FIG. 1, reference numeral 1 designates a shell, 2, a piston slidably arranged in the shell 1, and 3 a diaphragm which, together with the piston 2, divides the interior of the shell 1 into a constant pressure (or negative pressure) chamber 4 and a variable pressure chamber 5. A valve housing 2A incorporating a control valve 6 extends from the axial part of the piston 2. Under normal conditions, the control valve 6 communicates the constant pressure chamber 4 with the variable chamber 5. However, when a control valve body 7 made of elastic material is displaced to the left-hand side in FIG. 1 by an input shaft 8, the control valve 6 interrupts the communication between the two chambers 4 and 5 and then introduces air into the variable pressure chamber 5. As a result, a thrust attributed to the pressure difference between the two chambers is applied to the piston 2 and a push rod 9.

A skirt 10 and an annular seat 11 are formed at the rear of the control valve body 7. The annular seat 11 is held in abutment with a step 15 formed on the inner wall of the valve housing 2A by coiled tensioned compression spring 14 provided between the rear end spring seat 12A of a retainer 12 covering the rear end portion and the inner wall portion of the annular seat and a spring seat 13 locked to the input shaft 8. Thus, the constant pressure chamber 4 and the variable pressure chamber 5 are maintained airtight by the annular seat 11. A typical example of such a conventional structure is shown in U.S. Pat. No. 3,452,646.

Recently, there has been a strong demand for reducing the weight and size of a brake power servo booster of this type and related components. In order to increase the space in the operating chamber, a method of decreasing the mounting length (L) of the power servo booster which protrudes into the operating chamber has been proposed. However, with the above-described conventional structure, the reduction of the length of the valve housing 2A is limited to a certain value. Accordingly, the reduction must be carried out at the sacrifice of a space (S) for incorporating a filter or a silencer 16.

In view of the foregoing, an object of the invention is to provide a vacuum power servo booster in which the length of the portion thereof which protrudes into the operating chamber is substantially reduced, or otherwise if the length of the protruding portion is equal to that of a conventional booster, the thickness of a filter or silencer used therewith can be increased. It is a still further object of the invention to provide such a booster in which the control valve can be readily inserted into the valve housing.

SUMMARY OF THE INVENTION

In accordance with these objects, a vacuum power servo booster is provided in which, according to the invention, a retainer for an annular seat extending from the control valve body is improved in such a manner that a spring seat for a compression spring adapted to press the annular seat against the valve housing is formed at the front end portion of the retainer. A recess is formed on the front side of the spring seat to receive the skirt of the control valve body. The retainer is suitably bent to form the spring seat and to provide a space or recess for allowing a skirt of the valve body to be deformed thereinto. This structure causes the longitudinal axis of the retainer to substantially coincide with that of the control valve body.

DESCRIPTION OF THE PREFERRED EMBODIMENTS

Figure 1:
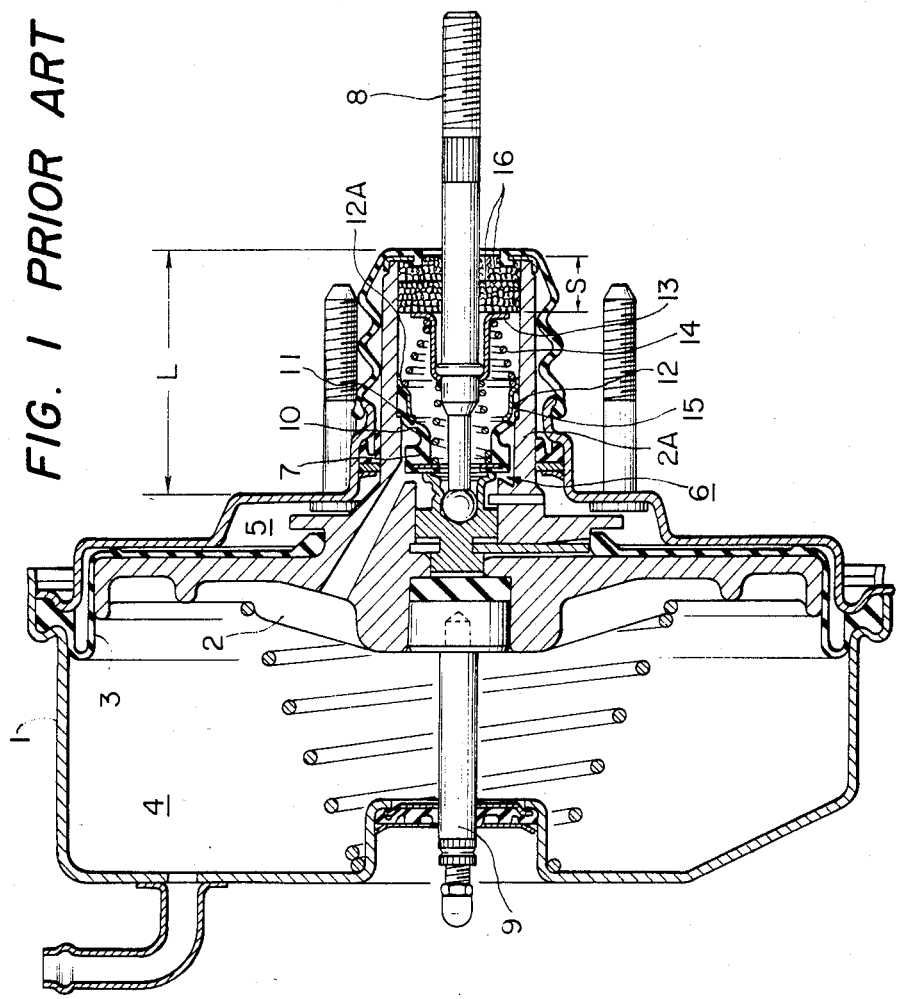
FIG. 1 is a longitudinal sectional view showing an example of a conventional brake power servo booster.

The invention will be described with reference to a preferred embodiment thereof shown in FIG. 2. The vacuum power servo booster shown in FIG. 2 differs from the conventional booster shown in FIG. 1 in the arrangement of components around a retainer 20 which is provided for an annular seat 11 integral with a control valve body 7. Common components of the boosters of FIGS. 1 and 2 are designated by the same reference numerals or characters.

The retainer 20 is constructed by a cylinder 21 having a front portion on the shell side and a rear portion on the input shaft side. The front portion and the rear portion provide a stepped portion at their boundary. The front portion provides a smaller diameter portion so as to cover the rear end portion and the inner wall portion of the annular seat 11 of the control valve body 10 and to provide an interior space 25 (referred to later as a recess 25). On the other hand, the rear portion of the retainer provides a larger diameter portion in contact with a sleeve portion of the power piston 2. A spring seat 23 is formed by folding the front end portion of the cylinder 21 inwardly and then toward the center. As shown in FIG. 2, the front portion (smaller diameter portion) of the retainer is folded back in substantially parallelism, and the tip end thereof is bent radially inwardly to provide the spring seat 23 and the recess 25. The folded portion, however, is not limited to a parallel arrangement relative to the remainder of the smaller diameter portion. Instead, it would be possible to bend the smaller diameter portion to form a V shaped orientation and then bend the tip end radially inwardly so as to provide the recess 25. The coiled compression spring 14 is inserted between the spring seat 23 thus formed and a seat 24 locked to the input shaft 8 so that as in the conventional booster, the annular seat 11 is held in abutment against the inner wall of the valve housing 2A and the step 15 formed on the inner wall.

Figure 2:
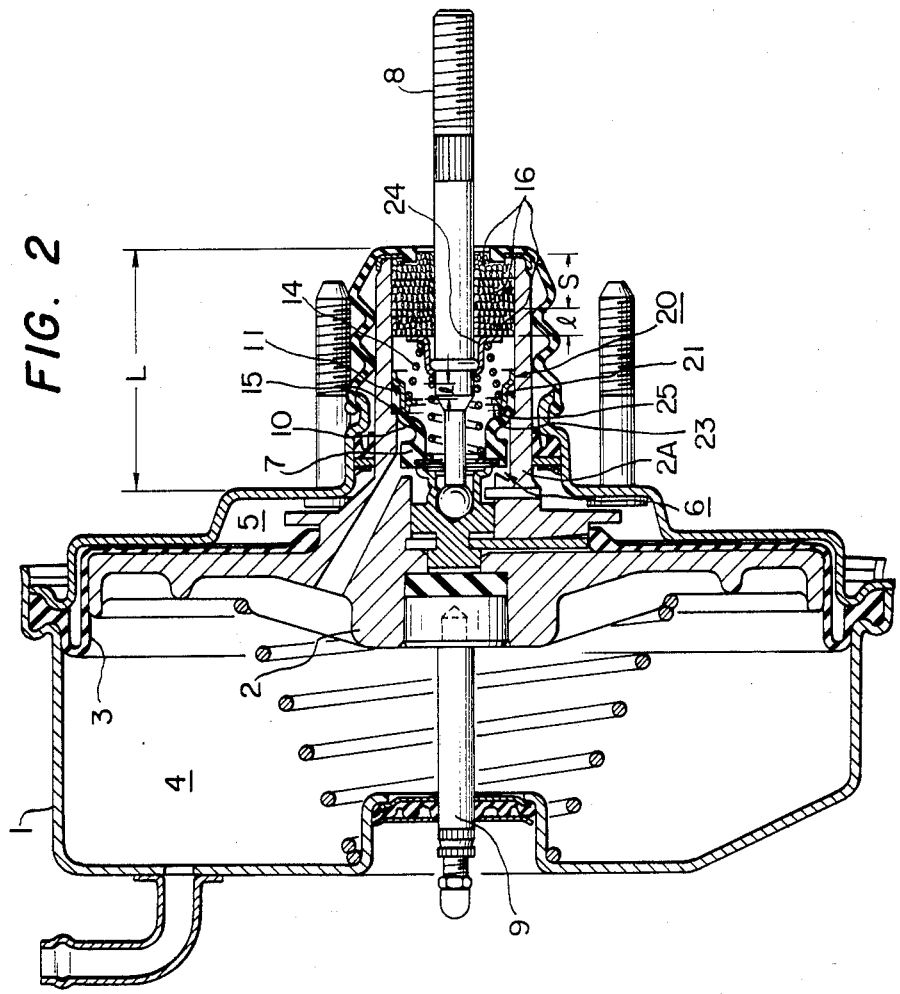
FIG. 2 is a longitudinal sectional view showing a preferred embodiment of a brake power servo booster according to the invention.

The spring seat 24 corresponds to the spring seat 13 in FIG. 1. However, it should be noted that the spring seat 24 is displaced forwardly compared with the spring seat 13. That is, by forming the spring seat 23 at the front end of the retainer 20, the compression spring 14 is moved forwardly through a length l compared with the spring in the conventional booster. Accordingly, the spring seat 24 is also moved forwardly.

On the front side of the spring seat 24, a recess 25 is formed by the spring seat 24 and the bent portion of the aforementioned cylinder 21. If the spring 14 is expanded to bend the control valve body 7 thereby to deform the control valve 6 into the valve housing 2A, the recess 25 thus can receive the skirt 10 of the control valve body 7.

Thus, if the thickness of the filter or silencer is the same as that in the conventional booster, then in the booster of the present invention the length of the valve housing 2A can be reduced by the aforementioned value l. Otherwise, if the length of the valve housing 2A is equal to that of the conventional valve housing, then in the booster of the invention the thickness of the filter or silencer can be increased by as much as the length l, thereby improving the air cleaning and the silencing effect. The above-described two advantages of the invention, namely that the axial length can be reduced and the space for incorporating the filter or silencer can be increased, can be used in combination selectively according to the operating requirements of the vehicle on which the vacuum power servo booster of the invention is used.

In general, in inserting the control valve 6 into the valve housing 2A, the spring 14 is expanded to displace the retainer 20 forwardly in order to positively abut the annular seat 11 against the step 15 of the valve housing. In the case of the vacuum power servo booster of the invention, the skirt 10 of the control valve body 7 at this time is positively incorporated into the recess 25 and therefore, the center or longitudinal axes of the retainer 20 and the control valve body 7 are made to coincide with each other. Thus, the assembling efficiency of the device is significantly improved.

As is apparent from the above description, the invention is advantageous not only in that the axial length can be reduced and the space which receives the filter or silencer increased, but also in that the assembling efficiency in inserting the control valve into the valve housing is improved.

What is claimed is:

1. A control valve for a vacuum power servo booster for controlling communication between a constant pressure chamber and a variable pressure chamber of said booster, said booster having a piston coupled to a forward end of an input shaft and a generally cylindrically shaped valve housing extending rearwardly from said piston, said control valve comprising: a control valve body having a forward portion abutting a rear portion of said piston, a rearward portion forming an annular seat abutting a stepped portion of said valve housing, and a flexible skirt portion joining said forward and rearward portions; a retainer having a forward end extending into said rearward portion of said control valve body, said retainer having an annular portion within said rearward portion of said control valve body extending perpendicular to a longitudinal axis of said valve housing and a cylindrical wall portion coaxial with said longitudinal axis, having a larger diameter section extending rearwardly and a smaller diameter section extending forwardly of said annular portion, surrounding said annular portion, and forming forwardly of said annular portion and at the front portion of said retainer a recess sized and shaped to receive said skirt portion of said control valve body, said skirt portion being positively incorporated into said recess in the insertion of said control valve body into said valve housing, said recess being defined by an inner peripheral surface of said smaller diameter portion and a front surface of said annular portion; a first spring extending through an aperture in said annular portion of said retainer and abutting at opposite ends a rear surface of said forward portion of said control valve body and a first stop on said input shaft; and a second spring abutting at opposite ends a rear surface of said annular portion of said retainer and a second stop on said input shaft, an inner diameter of said forward portion of said cylindrical wall portion of said retainer being larger than an external diameter of said skirt portion of said control valve body where said skirt portion joins said forward portion of said control valve body, said annular portion and an adjacent portion thereto being arranged such that said skirt portion is receivable into said recess in a manner avoiding radially inward movement of said skirt toward said first spring.

2. The control valve of claim 1, wherein said retainer comprises a metal body in which said forward section of said cylindrical portion of said retainer comprises a cylindrical wall doubled back 180° on itself.

* * * * *